United States Patent
Hyde et al.

(10) Patent No.: US 9,946,094 B2
(45) Date of Patent: Apr. 17, 2018

(54) LIGHT STEERING OPTICAL ASSEMBLY WITH CHROMATIC CORRECTION

(71) Applicant: Elwha LLC, Bellevue, WA (US)

(72) Inventors: Roderick A. Hyde, Redmond, WA (US); Jordin T. Kare, San Jose, CA (US)

(73) Assignee: ELWHA LLC, Bellevue, WA (US)

( * ) Notice: Subject to any disclaimer, the term of this patent is extended or adjusted under 35 U.S.C. 154(b) by 58 days.

(21) Appl. No.: 14/881,707

(22) Filed: Oct. 13, 2015

(65) Prior Publication Data
US 2017/0102559 A1  Apr. 13, 2017

(51) Int. Cl.
| G02C 3/00 | (2006.01) |
| G02C 7/10 | (2006.01) |
| G02C 7/14 | (2006.01) |

(52) U.S. Cl.
CPC .......... *G02C 7/14* (2013.01); *G02C 2202/10* (2013.01); *G02C 2202/20* (2013.01); *G02C 2202/22* (2013.01)

(58) Field of Classification Search
CPC ........ G02C 7/022; G02C 7/025; G02C 7/026; G02C 7/12; G02C 7/14; G02C 2202/20; G02C 2202/06; G02C 2202/22; G02C 2202/24; G02C 7/0022; G02C 7/1214; A61F 2/1613; A61F 2/1648; A61F 2/1627; A61F 2250/0053; A63B 33/002
USPC ............ 351/159.58, 159.17, 159.08, 159.44, 351/159.45, 159.11, 159.15, 159.35; 359/630, 640, 571, 831, 743, 576, 599, 359/482, 407, 569; 623/6.26, 6.13, 6.34; 362/607

See application file for complete search history.

(56) References Cited

U.S. PATENT DOCUMENTS

| | | | |
|---|---|---|---|
| 4,581,031 A | 4/1986 | Koziol et al. | |
| 4,846,833 A | 7/1989 | Cumming | |
| 5,178,636 A | 1/1993 | Silberman | |
| 5,683,457 A | 11/1997 | Gupta et al. | |
| 5,728,156 A | 3/1998 | Gupta et al. | |
| 6,934,084 B2 * | 8/2005 | Pandya | G02C 7/14 351/159.58 |
| 7,229,475 B2 | 6/2007 | Glazier | |
| 7,374,284 B2 | 5/2008 | Peli | |
| 7,410,500 B2 | 8/2008 | Claoue | |
| 8,137,399 B2 | 3/2012 | Glazier et al. | |
| 8,657,877 B2 | 2/2014 | Glazier | |
| 2002/0163725 A1 * | 11/2002 | Kobayashi | G02B 5/1814 359/576 |
| 2005/0071002 A1 | 3/2005 | Glazier | |
| 2005/0119739 A1 | 6/2005 | Glazier | |

(Continued)

OTHER PUBLICATIONS

Lipshitz, Isaac, "Pseudophakic mirror telescopic implant can benefit AMD patients", Ocular Surgery News U.S. Edition, Dec. 10, 2013, pp. 1-3.

*Primary Examiner* — Mustak Choudhury (74) *Attorney, Agent, or Firm* — Daniel J. Honz; Advent, LLP (57) ABSTRACT

A wearable optical assembly can include: a first array of aligned prisms configured to direct light towards a first target region; and one or more first chromatic correction elements in series with the first array of aligned prisms, the one or more first chromatic correction elements being configured to compensate for color dispersion caused by the first array of aligned prisms.

11 Claims, 10 Drawing Sheets

(56) References Cited

U.S. PATENT DOCUMENTS

| | | |
|---|---|---|
| 2006/0229720 A1 | 10/2006 | Glazier et al. |
| 2007/0067030 A1 | 3/2007 | Glazier et al. |
| 2007/0097316 A1 | 5/2007 | Peli |
| 2010/0211167 A1 | 8/2010 | Glazier |
| 2012/0277857 A1 | 11/2012 | Purchase et al. |
| 2013/0222757 A1* | 8/2013 | Klein ................. G02C 7/14 |
| | | 351/111 |
| 2014/0135917 A1 | 5/2014 | Glazier |
| 2014/0360655 A1* | 12/2014 | Amemiya ............ B29C 59/04 |
| | | 156/209 |

\* cited by examiner

LIGHT STEERING OPTICAL ASSEMBLY WITH CHROMATIC CORRECTION

If an Application Data Sheet (ADS) has been filed on the filing date of this application, it is incorporated by reference herein. Any applications claimed on the ADS for priority under 35 U.S.C. § § 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)).

PRIORITY APPLICATIONS

None.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

BACKGROUND

An individual's vision can be affected by various diseases, such as macular degeneration or age-related macular degeneration (AMD), that cause dysfunctions in one or more portions of the retina. For example, cellular debris (e.g., drusen) can accumulate between the retina and the choroid, resulting in atrophy or scarring of the retina. In other instances, abnormal blood vessels can grow near the retina and may leak fluid or hemorrhage. The blood or fluid from these blood vessels can block or damage photoreceptors of the retina. Typically, AMD affects the macula (central field of vision), but other portions of the retina (and other visual fields) can also become dysfunctional as result of debris, abnormal blood vessel growth or hemorrhaging, or the like.

SUMMARY

In one aspect, a wearable optical assembly includes, but is not limited to, a first array of aligned prisms configured to direct light towards a first target region; and one or more first chromatic correction elements in series with the first array of aligned prisms, the one or more first chromatic correction elements being configured to compensate for color dispersion caused by the first array of aligned prisms.

In another aspect, a system for improving vision includes, but is not limited to, at least one vision corrective element; a first array of aligned prisms coupled to a portion of the at least one vision corrective element, the first array of aligned prisms being configured to direct light towards a first target region; and one or more first chromatic correction elements in series with the first array of aligned prisms, the one or more first chromatic correction elements being configured to compensate for color dispersion caused by the first array of aligned prisms.

In another aspect, a method includes, but is not limited to, directing light towards a first target region with a first array of aligned prisms; and compensating for color dispersion caused by the first array of aligned prisms with one or more first chromatic correction elements placed in series with the first array of aligned prisms.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 4 is an illustration of an embodiment of a light steering optical assembly, such as the light steering optical assembly shown in at least one of FIGS. 1 through 2D, where the light steering optical assembly is coupled to or integrated within a vision correction element, such as a contact lens or the like.

FIG. 5 is an illustration of an embodiment of a light steering optical assembly, such as the light steering optical assembly shown in at least one of FIGS. 1 through 2D, where the light steering optical assembly is coupled to or integrated within a vision correction element, such as an intraocular lens or the like.

FIG. 6 is an illustration of an embodiment of a light steering optical assembly, such as the light steering optical assembly shown in at least one of FIGS. 1 through 2D, where the light steering optical assembly is formed into corneal tissue of an eye with a LASIK procedure or the like.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Light enters the eye through the cornea, passes through the lens, and converges on the retina, the light-detecting inner surface of the eye. One or more portions of the retina may be dysfunctional due to an injury, abnormality, or a disease, such as macular degeneration or age-related macular degeneration (AMD). For example, cellular debris (e.g., drusen) can accumulate between the retina and the choroid, resulting in atrophy or scarring of the retina. In other instances, abnormal blood vessels can grow near the retina and may leak fluid or hemorrhage. The blood or fluid from these blood vessels can block or damage photoreceptors of the retina. Typically, AMD affects the macula (central field of vision), but other portions of the retina (and other visual fields) can also become dysfunctional as result of debris, abnormal blood vessel growth or hemorrhaging, or the like. Other dysfunctions of the eye can occur at the cornea, lens, or any other eye structure. For example, inflamed, damaged, or improperly functioning corneal, lens, or eye muscle tissue can result in diplopia (also referred to as "double vision"), where the dysfunctional tissue affects the focus and direction of light entering the eye.

Optical assemblies and methods are disclosed herein for steering light towards a selected target region. For example, to assist individuals suffering from AMD or other diseases that affect retinal tissue, light can be steered away from a dysfunctional portion of an individual's retina, towards a healthier portion of the retina. In some embodiments, one or more chromatic correction elements are included in a wearable, implantable, or surgically formed optical assembly to compensate for color dispersion that results when the incoming light is steered towards the target region. For example, light can be steered towards the target region with an array of aligned prisms (e.g., Fresnel prisms or Fresnel lens structures) that are worn, implanted, or surgically formed; however, these prisms may refract different wavelengths of light at different angles. This phenomenon is sometimes referred to as "chromatic aberration" and can cause visual distortion (e.g., blurring) due to differences in convergence points of the different wavelengths or colors of light.

Figure 1:
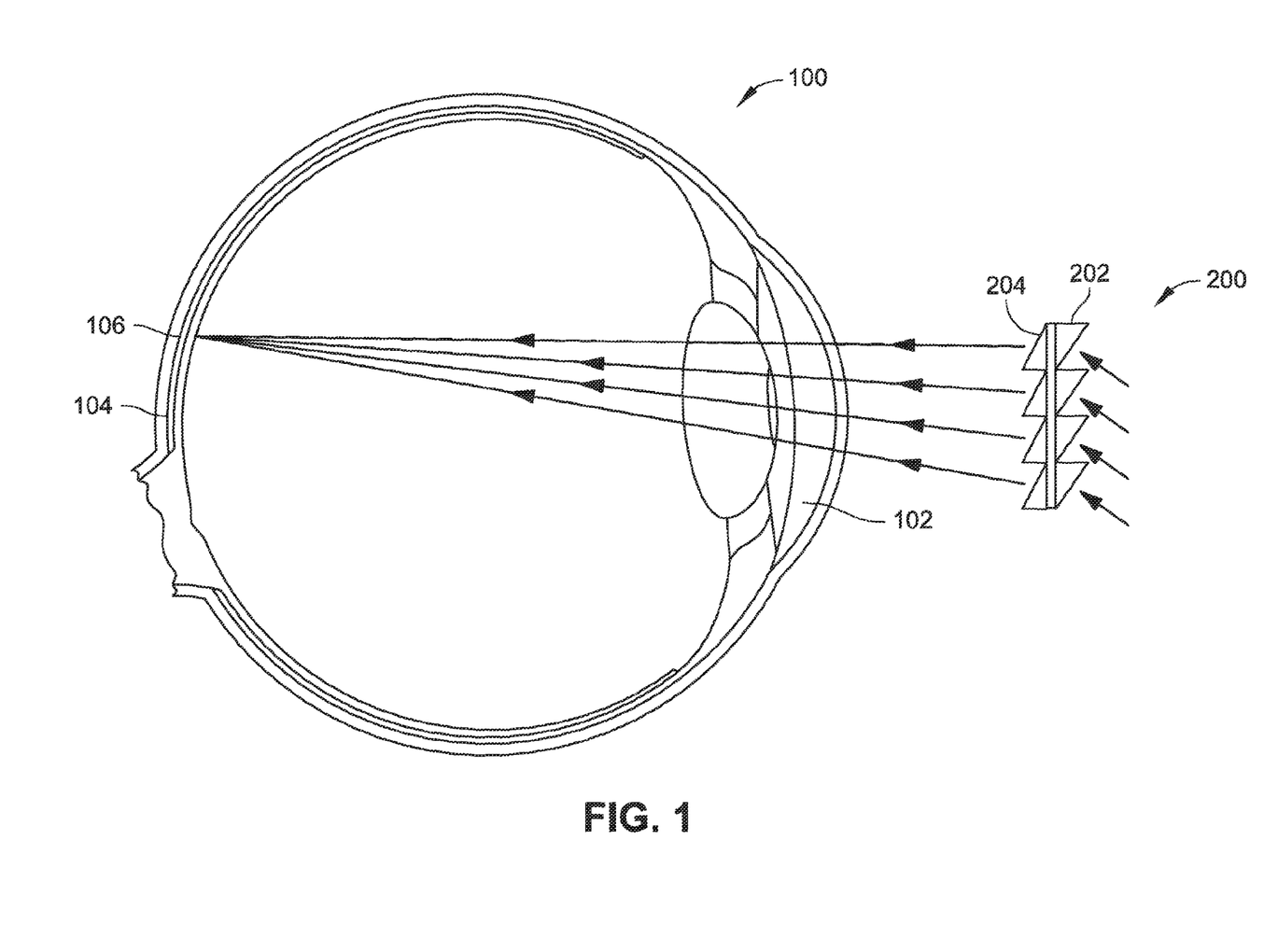
FIG. 1 is an illustration of an embodiment of a light steering optical assembly relative to an eye.
Figure 1A:
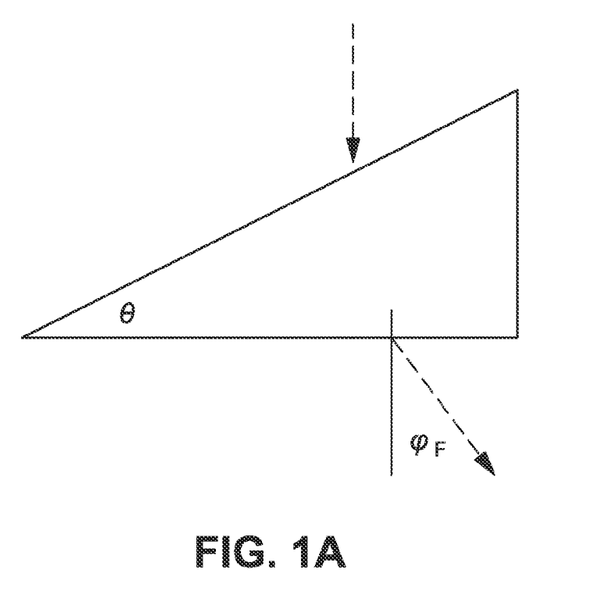
FIG. 1A is an illustration of light incident on a forward-facing prism.
Figure 1B:
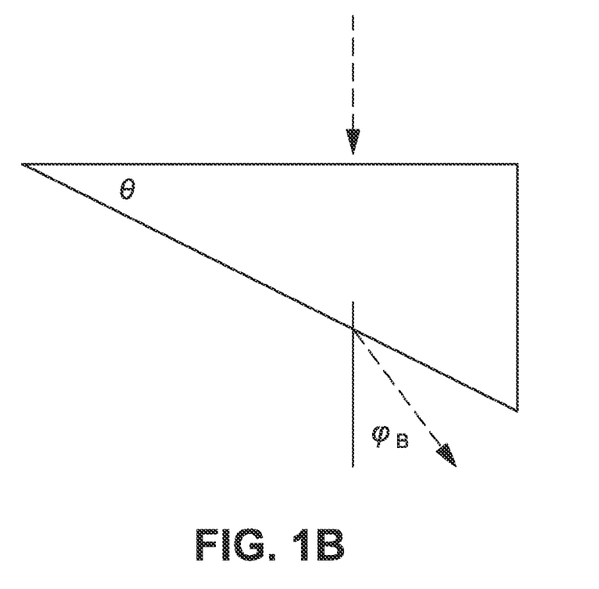
FIG. 1B is an illustration of light incident on a backward-facing prism.

Referring to FIGS. 1 through 6, embodiments of an optical assembly 200 are shown to include an array of aligned prisms 202 and one or more chromatic correction elements 204 in series with the array of aligned prisms 202. The array of aligned prisms 202 can include Fresnel prisms or the like. The array of aligned prisms 202 can be positioned relative to an eye 100 such that, before or after entering the eye's cornea 102, incoming light is steered by the array of aligned prisms 202 towards a target region. For example, the array of aligned prisms 202 can steer incoming light towards a selected portion of retinal tissue 106. In some embodiments, the array of aligned prisms 202 directs the incoming light at an oblique angle (e.g., 0 to 5 degrees) relative to a central axis of the eye. For example, in instances where an individual suffers from AMD, the array of aligned prisms 202 can direct the incoming light away from the macula (i.e., the central field of vision) which may be associated with a dysfunctional portion of retinal tissue 104. The array of aligned prisms 202 can direct the incoming light towards a target region including a healthier or higher performing portion of retinal tissue 106. In some embodiments, the facet angle θ (as shown in FIGS. 1A and 1B) may be between 0 and 15 degrees. In some embodiments in which chromatic correction elements 204 deflect light oppositely to the array of aligned prisms 202, the facet angle for prisms in the array of aligned prisms 202 may be significantly larger, e.g., up to 45 or 60 degrees. Facet depths for prisms in the array of aligned prisms 202 may be selected to be multiple wavelengths thick (i.e., thick enough such that they act optically more as refractive prisms than as diffractive elements), while being thin enough to minimize the weight and thickness of optical assembly 200. In some embodiments, facet depths are between 10 microns and 5 millimeters. In some embodiments, the array of aligned prisms 202 only directs a portion of incoming light towards the target region. For example, portions of incoming light can be directed at an angle, while other portions transmit straight through array of aligned prisms 202.

The one or more chromatic correction elements 204 are positioned in series with the array of aligned prisms to compensate for color dispersion caused by the array of aligned prisms 202. For example, the one or more chromatic correction elements 204 can compensate for refraction of light by the array of aligned prisms 202. As shown in FIG. 1, the one or more chromatic correction elements 204 are positioned such that they combine with the array of aligned prisms 202 to affect the steering of light. The steering of light by the array of aligned prisms 202 is primarily driven by the position, material properties (e.g., index of refraction), facet dimensions, spacing, slopes, angles, orientation, and so forth. For example, light normally incident on an array of forward-facing prisms as shown in FIG. 1A is deflected by an angle $\varphi_F$, given by $$\sin \varphi_F = (\sqrt{n^2 - \sin\theta^2} - \cos\theta)\sin\theta \approx (n-1)\sin\theta \text{ for small } \theta$$

while light normally incident on an array of backward-facing prisms as shown in FIG. 1B is deflected by a different angle $\varphi_B$, given by $$\sin \varphi_B = (n\cos\theta - 1 - n^2 \sin^2\theta)\sin\theta \approx (n-1)\sin\theta \text{ for small } \theta$$

In some embodiments, the one or more chromatic correction elements 204 also steer incoming light (e.g., at a lower power than the array of aligned prims 202), either in the same direction as the array of aligned prisms 202 or in an opposing direction. For example, when using diffraction gratings, the one or more chromatic correction elements 204 can steer light further in the same direction as the array of aligned prisms 202 such that incoming light is bent at an angle of N degrees, where N=m+n, the array of aligned prisms 202 bend light in a first direction in degrees, and the one or more chromatic correction elements 204 bend light further in the first direction n degrees. In cases where the one or more chromatic correction elements 204 include a compensatory array of aligned prisms, they can bend light in an opposing direction such that incoming light is bent at an angle of N' degrees, where N'=m−n, the array of aligned prisms 202 bend light in a first direction m degrees, and the one or more chromatic correction elements 204 bend light in a second (opposing) direction n degrees. In either case, n may be smaller than m. The array of aligned prisms 202 and the one or more chromatic correction elements 204 can be selected such that the steering direction and power (e.g., n and m values) of the optical assembly 200 cause incoming light to be steered towards the target region. In some embodiments, incident light is steered first by the array of aligned prisms 202 and then subsequently by the one or more chromatic correction elements 204. In other embodiments this order is reversed, so that incident light is steered first by the one or more chromatic correction elements 204 and then subsequently by the array of aligned prisms 202.

Figure 2A:
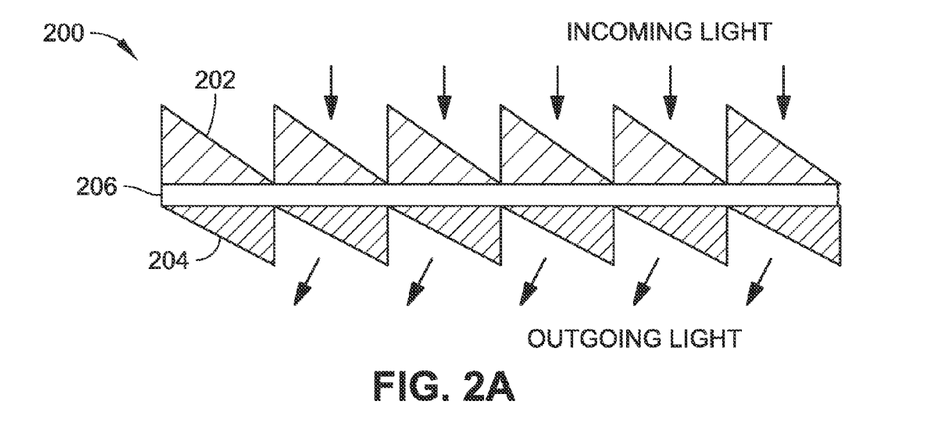
FIG. 2A is an illustration of an embodiment of a light steering optical assembly.
Figure 2B:
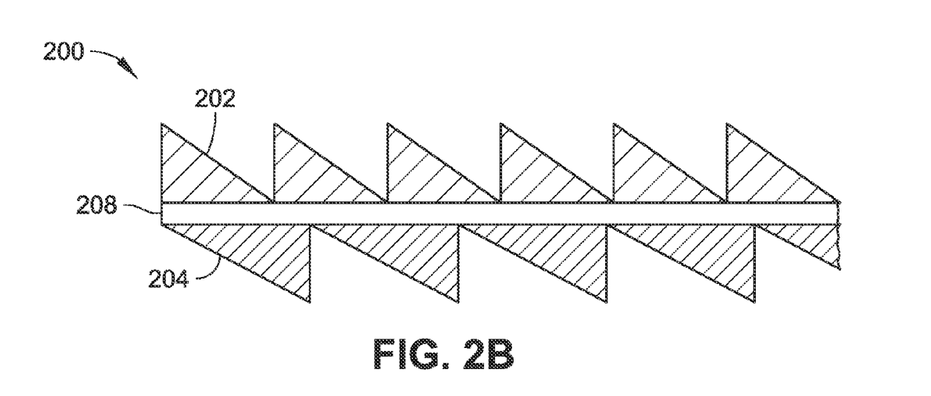
FIG. 2B is an illustration of an embodiment of a light steering optical assembly.
Figure 2C:
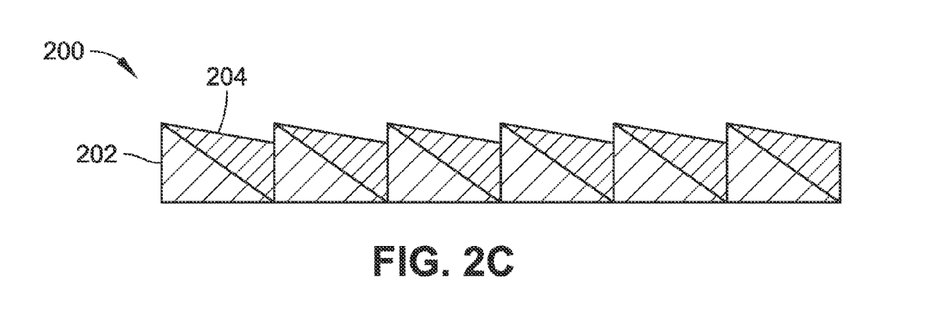
FIG. 2C is an illustration of an embodiment of a light steering optical assembly.

FIGS. 2A through 2E show various embodiments of optical assembly 200, where the array of aligned prisms 202 and the one or more chromatic correction elements 204 are positioned relative to one another in accordance with several configurations. In some embodiments, the one or more chromatic correction elements 204 can include a compensatory array of aligned prisms (e.g., as shown in FIGS. 2A-2C). In some embodiments, the one or more chromatic correction elements 204 can include one or more diffraction gratings 210, which may be much smaller in size (e.g., facet depth, facet separation, grating period, etc.) than the array of aligned prisms 202. The one or more chromatic correction elements 204 can include achromatic lenses or structures of any type. For example, the one or more chromatic correction elements 204 can include any optical element or set of optical elements (e.g., a compensatory array of aligned prisms, reversely oriented so as to have an opposing deflection angle) substantially satisfying the following relationship:

$$P_1 - P_2 = P_{Total}; \text{ and}$$

$$\frac{P_1}{V_1} - \frac{P_2}{V_2} = 0,$$

where $P_1$ is the optical power of the array of aligned prisms 202 (i.e., $(n_1-1) \sin \theta_1$), $P_2$ is the optical power of one or more compensatory chromatic correction elements 204 (i.e., $(n_2-1) \sin \theta_2$) for a compensatory array of aligned prisms), $P_{Total}$ is a selected power for the optical assembly 200, and $V_1$ and $V_2$ are Abbe numbers for materials making up the array of aligned prisms 202 and the one or more chromatic correction elements 204, respectively. The Abbe numbers are associated with dispersion characteristics of the materials making up the array of aligned prisms 202 and the one or more chromatic correction elements 204; for example, polycarbonate plastics generally have low Abbe values (~30) while crown glasses have higher values (—~60). In some embodiments, the array of aligned prisms 202 and the one or more chromatic correction elements 204 can have different dispersion characteristics. For example, the array of aligned prisms 202 and the one or more chromatic correction elements 204 (e.g., a compensatory array of aligned prisms) can include different materials (e.g., materials having different indices $n_1$ and $n_2$ as well as different Abbe numbers, $V_1$ and $V_2$). The properties of the compensatory array of aligned prisms 204 can be selected so as to cancel the chromatic dispersion of the array of aligned prisms 202:

$$P_2 = \frac{V_2}{V_1} P_1$$

$$P_{Total} = \left(1 - \frac{V_2}{V_1}\right) P_1$$

The materials can include glass, plastic, or hydrophobic or hydrophilic polymers. For example, polymers can include those containing acrylate and methacrylate (e.g., polymethyl methacrylate), silicone elastomers (e.g., dimethylsiloxane), polyvinyl chloride, or the like. In some embodiments, the array of aligned prisms 202 or the one or more chromatic correction elements 204 can be coated with one or more films that affect index of refraction, dispersion, or other optical properties of the prisms 202 or chromatic correction elements 204. The array of aligned prisms 202 and the one or more chromatic correction elements 204 can also be sized differently from one another (e.g., different lengths, widths, facet dimensions, or facet angles, and so forth). Dimensions and other geometric attributes of the array of aligned prisms 202 and the one or more chromatic correction elements 204 may also affect respective optical power or dispersion characteristics of the array of aligned prisms 202 or chromatic correction elements 204.

The one or more chromatic correction elements 204 (e.g., compensatory prisms) can be positioned inversely to the array of aligned prisms 202. For example, the one or more chromatic correction elements 204 can have sloped facets facing in an opposing direction to sloped facets of the array of aligned prisms 202. In some embodiments, the sloped facets of the one or more chromatic correction elements 204 and the sloped facets of the array of aligned prisms 202 can face away from one another (e.g., as shown in FIGS. 2A and 2B), or the sloped facets of the one or more chromatic correction elements 204 and the sloped facets of the array of aligned prisms 202 can face towards one another (e.g., as shown in FIG. 2C). In some embodiments, the facets of the array of aligned prisms 202 and the one or more chromatic correction elements 204 face towards one another and the prisms 202 and chromatic correction elements 204 are interleaved (e.g., as shown in FIG. 2C). Such an arrangement can allow for a reduced overall size of the optical assembly 200.

As shown in FIG. 2A, the array of aligned prisms 202 and the one or more chromatic correction elements 204 can be separated by a spacer 206 or an air gap. The array of aligned prisms 202 and the one or more chromatic correction elements 204 can also be directly adjacent to one another. In some embodiments (e.g., as shown in FIG. 2B), the array of aligned prisms 202 and the one or more chromatic correction elements 204 can be separated by an index-transition layer 208. The index-transition layer 208 can include a material having an index of refraction that is approximately equal to a geometric mean of the refractive indices of the materials making up the array of aligned prisms 202 and the one or more chromatic correction elements 204. In some embodiments, index-transition layer 208 can include multiple layers of different-index materials, thereby providing a more gradual index of refraction transition than possible with a single material. The index-transition layer 208 can smooth optical transition between the two materials, thereby reducing reflections that can occur when light travels through adjacent media having different refractive indices. In some embodiments, the index-transition layer 208 can be formed between the array of aligned prisms 202 and the one or more chromatic correction elements 204.

Figure 2D:
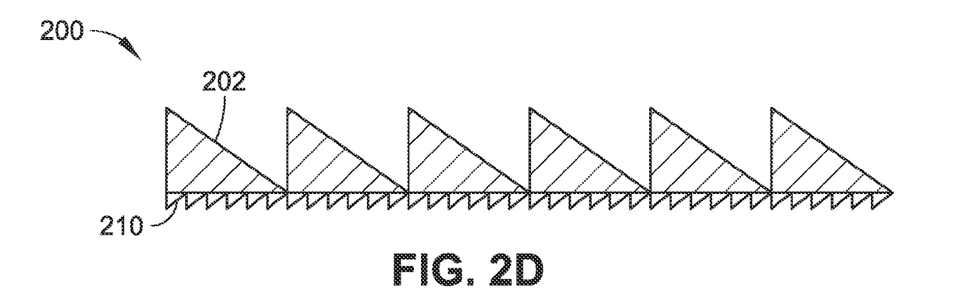
FIG. 2D is an illustration of an embodiment of a light steering optical assembly.

In some embodiments, the chromatic correction elements 204 can comprise diffractive elements, e.g., diffraction grating 210 as illustrated in FIG. 2D. The optical power (e.g., the fundamental, first harmonic, deflection) of a diffraction grating having grating period Δ is given by:

$$P_2 = \frac{\lambda}{\Delta}$$

This can be re-expressed in terms of a deflective power $P_2^*$ at a reference wavelength (e.g., the Fraunhofer D line at 589.3 nm) and a chromatic variation in terms of the fractional wavelength shift u from the reference wavelength:

$$P_2 = P_2^*(1+u) \text{ where } P_2^* = \frac{\lambda_*}{\Delta} \text{ and } u = \frac{\lambda - \lambda_*}{\lambda_*}$$

The optical power $P_2$ of diffraction grating 210 can be combined with the optical power $P_1$ of the array of aligned prisms 202. The $P_1$ power can also be expressed in terms of reference and chromatic portions:

$$P_1 = [n(\lambda) - 1]\sin\theta_1 \approx P_1^*\left[1 - \left(\frac{\lambda_*}{\lambda_C - \lambda_F}\frac{1}{V}\right)u\right] \approx P_1^*\left[1 - \frac{3.46}{V}u\right]$$

Here $\lambda_*$ is the Fraunhofer D line at 589.3 nm, $\lambda_C$ is the Fraunhofer C line at 656.3 nm, and $\lambda_F$ is the Fraunhofer F line at 486.1 nm. The grating period Δ of diffraction grating 210 can be chosen so that the chromatic power of diffraction grating 210 cancels that of the array of aligned prisms 202:

$$P_2^* = P_1^*\frac{3.46}{V} \text{ i.e., } \Delta = \frac{V}{3.46(n_* - 1)\sin\theta_1}\lambda_*$$

The overall optical power is then given by $$P_{Total} = P_1 + P_2 = P_1^*\left(1 + \frac{3.46}{V}\right)$$

Figure 2E:
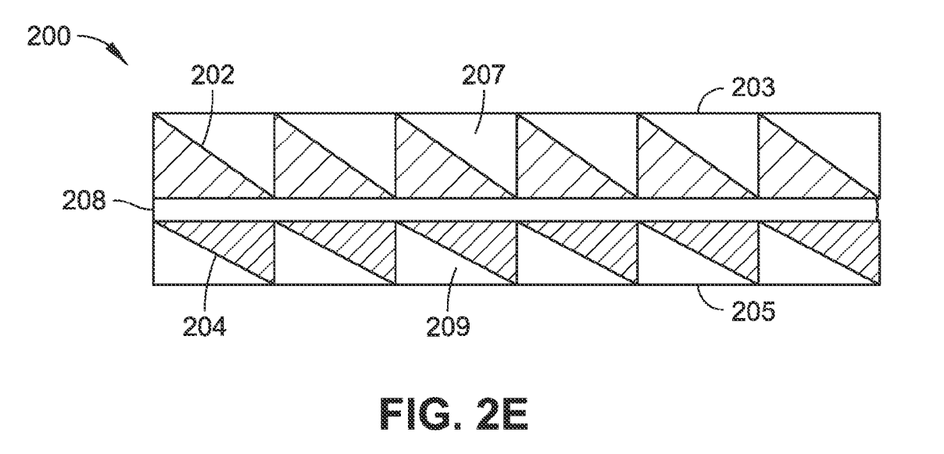
FIG. 2E is an illustration of an embodiment of a light steering optical assembly.

In some embodiments, the array of aligned prisms 202 is formed by an interface between at least two materials. For example, as illustrated in FIG. 2E, a first cover material 203 having a smooth outer surface can be placed adjacent to the sloped edges of the prisms 202, such that an external surface is substantially smooth (i.e., without grooves or trenches due to the sloped prism edges). This can prevent buildup of dust or other debris on the outer surface of the optical assembly 200. The first cover material 203 can be the same as the material used to form the array of aligned prisms 202 or it can be a different material, and can have different dispersion characteristics. For example, the first cover material 203 can at least partially offset dispersion of the array of aligned prisms 202. The one or more chromatic correction elements 204 can also be formed on respective interior surfaces between at least two materials. For example, the a second cover material 205 having a smooth outer surface can be placed adjacent to the sloped edges of mini-prisms or over a diffraction grating making up the one or more chromatic correction elements 204. The second cover material 205 can be the same as the material used to form the one or more chromatic correction elements 204 or it can be a different material, and can have different dispersion characteristics. The spaces between the smooth external surfaces and the prisms 202 or chromatic correction elements 204 can be air gaps (e.g., air gaps 207 and 209), or these spaces can be filled by materials 203 and 205, or by other materials, such as index-transition materials or the like.

The optical assembly 200 can be coupled with or integrated into a wearable device. Several examples are shown in FIGS. 3A through 6. In this context, a "wearable" optical assembly 200 can be physically worn on a person (e.g., coupled to or formed in an eyeglass or contact lens), surgically implanted (e.g., implanted in the form of an intraocular lens), or surgically formed (e.g., grafted, carved, melded, or etched into biological tissue).

Figure 3A:
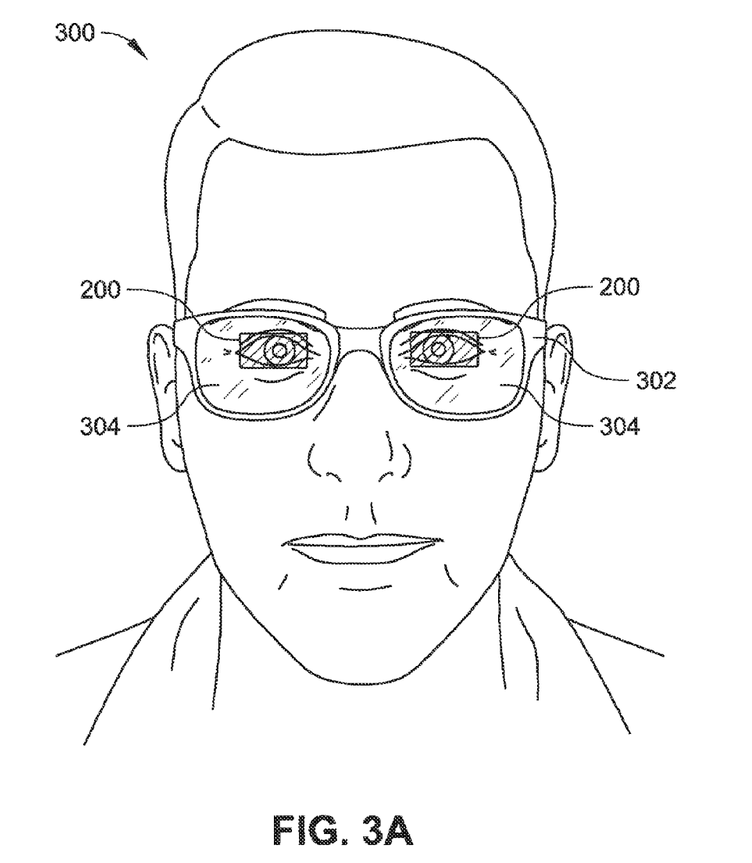
FIG. 3A is an illustration of an embodiment of a light steering optical assembly, such as the light steering optical assembly shown in at least one of FIGS. 1 through 2D, where the light steering optical assembly is coupled to or integrated within a vision correction element (e.g., lens) that is supported by a wearable frame.
Figure 3B:
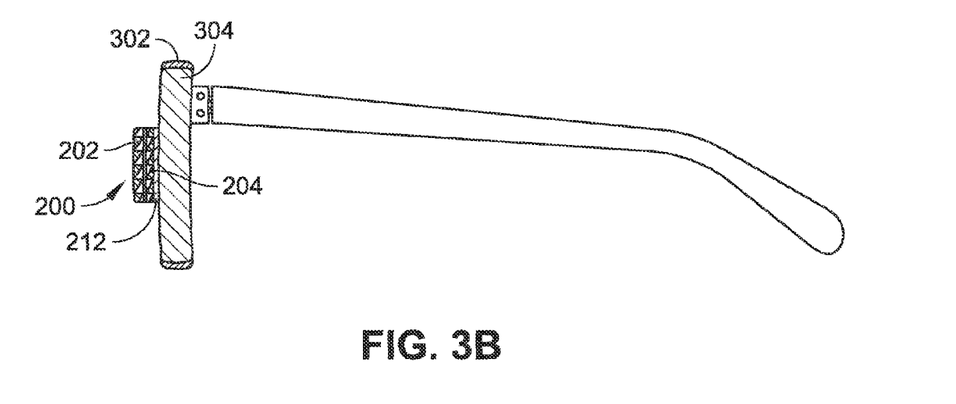
FIG. 3B is cross-sectional side view of an embodiment of a light steering optical assembly, such as the light steering optical assembly shown in at least one of FIGS. 1 through 2D, where the light steering optical assembly is coupled to a vision correction element (e.g., lens) that is supported by a wearable frame.

FIGS. 3A and 3B show an embodiment where the optical assembly 200 is coupled to eyeglasses or spectacles 300. In an embodiment, the overall lateral dimension of optical assembly 200 may be between 1 cm and 10 cm. In other embodiments, the optical assembly can be coupled or formed within a monocle or any other structure (e.g., binocular, monocular, telescope, microscope, etc.) including at least one lens 304 supported by a frame 302 that can be worn or carried by a person. The optical assembly 200 can be formed from rigid materials (e.g., rigid glass or plastic) or flexible materials (e.g., polyvinyl chloride or other polymers) that can be adhered to the lens 304. The lens 304 can include a corrective vision lens, tinted lens, polarized lens, or any other transparent or translucent lens structure. In some embodiments, the optical assembly 200 includes an adhesive layer 212 that couples the array of aligned prisms 202 and the one or more chromatic correction elements 204 to the lens 304. In other embodiments, the optical assembly 200 may be formed within the lens structure (e.g., integrated within lens 304). The optical assembly 200 can occupy substantially all of the lens 304 area or only a selected portion of the lens 304 area (e.g., as shown in FIG. 3A).

Figure 4:
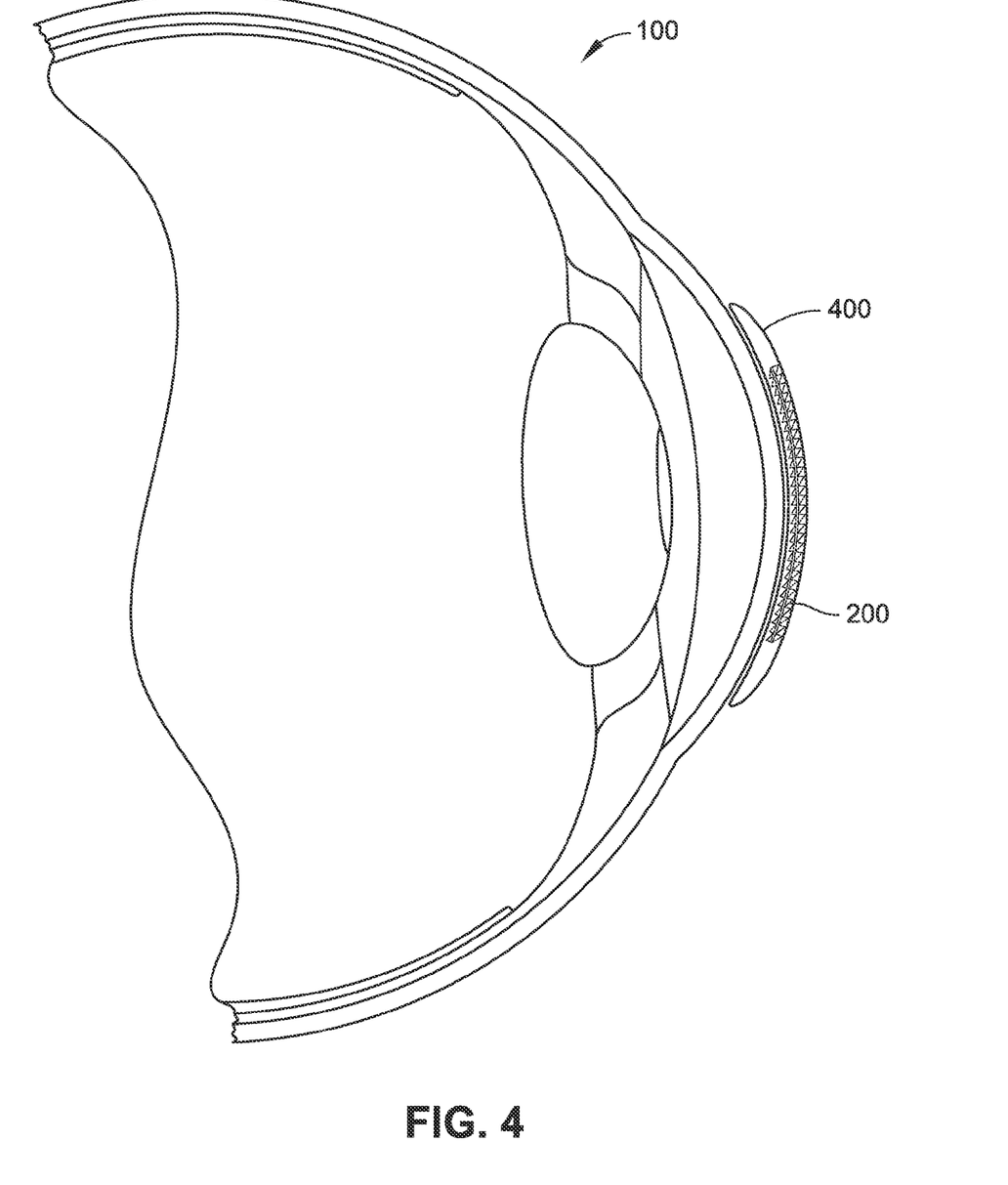
Figure 5:
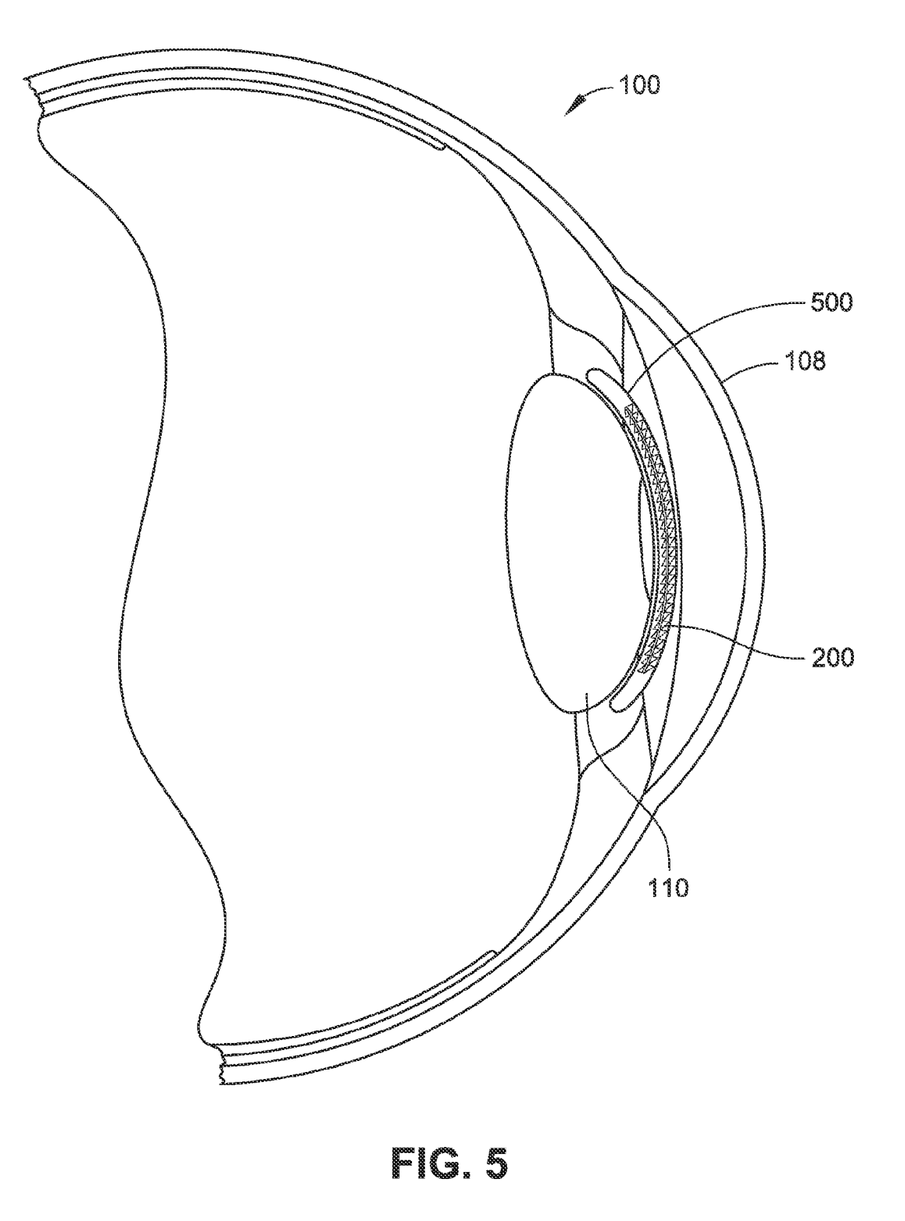

FIGS. 4 and 5 show embodiments of the optical assembly 200 formed in a flexible lens structure that can be positioned on the eye 100 (e.g., in a contact lens 400, as shown in FIG. 4) or surgically implanted in the eye 100 (e.g., in an intraocular lens 500 that is surgically positioned adjacent to or in place of the eye's crystalline lens 110, as shown in FIG. 5). The lens structure (e.g., contact lens 400, intraocular lens 500, or the like) can include at least two materials having different dispersion characteristics. For example, the lens structure can include at least a first material forming the array of aligned prisms 202 and a second material forming the one or more chromatic correction elements 204. In some embodiments, the first and second materials are embedded in a third material defining the lens structure. In some embodiments, the dispersion characteristics can be controlled by the geometry (e.g., dimensions, orientations, relative positions, etc.) of the prisms 202 and the chromatic correction elements 204, and as such, the prisms 202 and chromatic correction elements 204 are not necessarily formed by two different materials.

Figure 6:
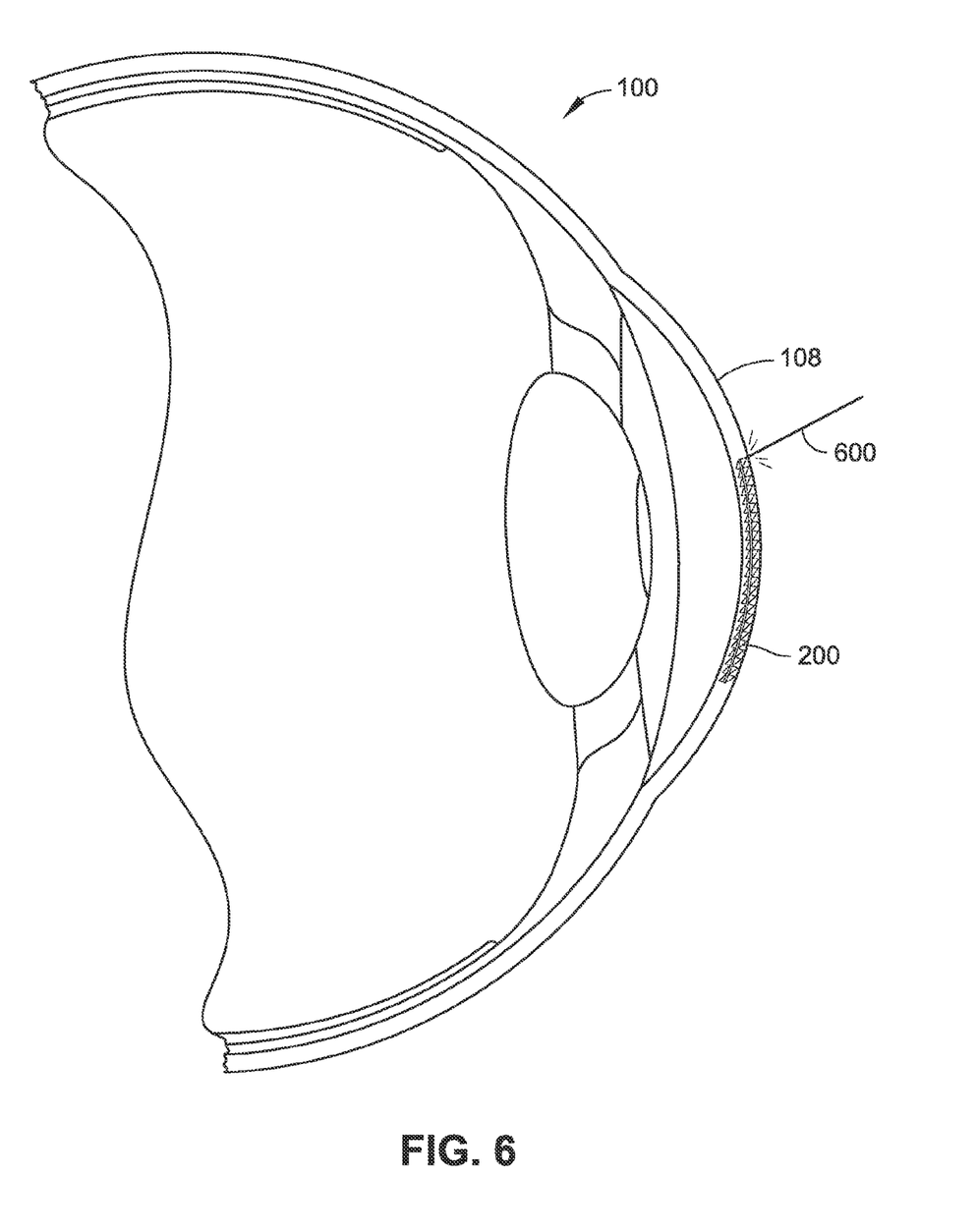

As shown in FIG. 6, the array of aligned prisms 202, the one or more chromatic correction elements 204, or both can also be surgically formed (e.g., grafted, carved, melded, or etched) in and/or on biological tissue. For example, the optical assembly 200 or at least a portion of the optical assembly 200 (e.g., prisms 202 or chromatic correction elements 204) can be carved or etched into corneal tissue 108 with a laser beam 600 or a surgical instrument. In some embodiments, technologies used in LASIK procedures are used to form the prisms 202 or the chromatic correction elements 204. Additionally, the corneal tissue 108 can be treated via a LASIK procedure to treat other abnormalities affecting vision, such as myopia, hyperopia, diplopia, astigmatism, or the like. In this regard, the corneal tissue 108 itself can be a vision corrective element.

In some embodiments, the optical assembly 200 can include a second array of aligned prisms 202 configured to direct light towards a second target region different from the first target region. For example, the second array of aligned prisms 202 can be configured to direct light towards a second portion of retinal tissue in the same eye, or the second array of aligned prisms 202 can be positioned relative to an individual's second eye (e.g., as shown in FIG. 3A) and configured to direct light towards a selected portion of retinal tissue in the second eye. Each of the individual's eyes can have differing degrees of AMD or can have different "good" or "bad" patches of retinal tissue, and as such, a suitable direction and angle of light steering can be different for each of the individual's eyes. The one or more chromatic correction elements 204 included in each of the optical assemblies 200 are appropriate to compensate for the color dispersion caused by the respective array of aligned prisms 202.

Figure 7:
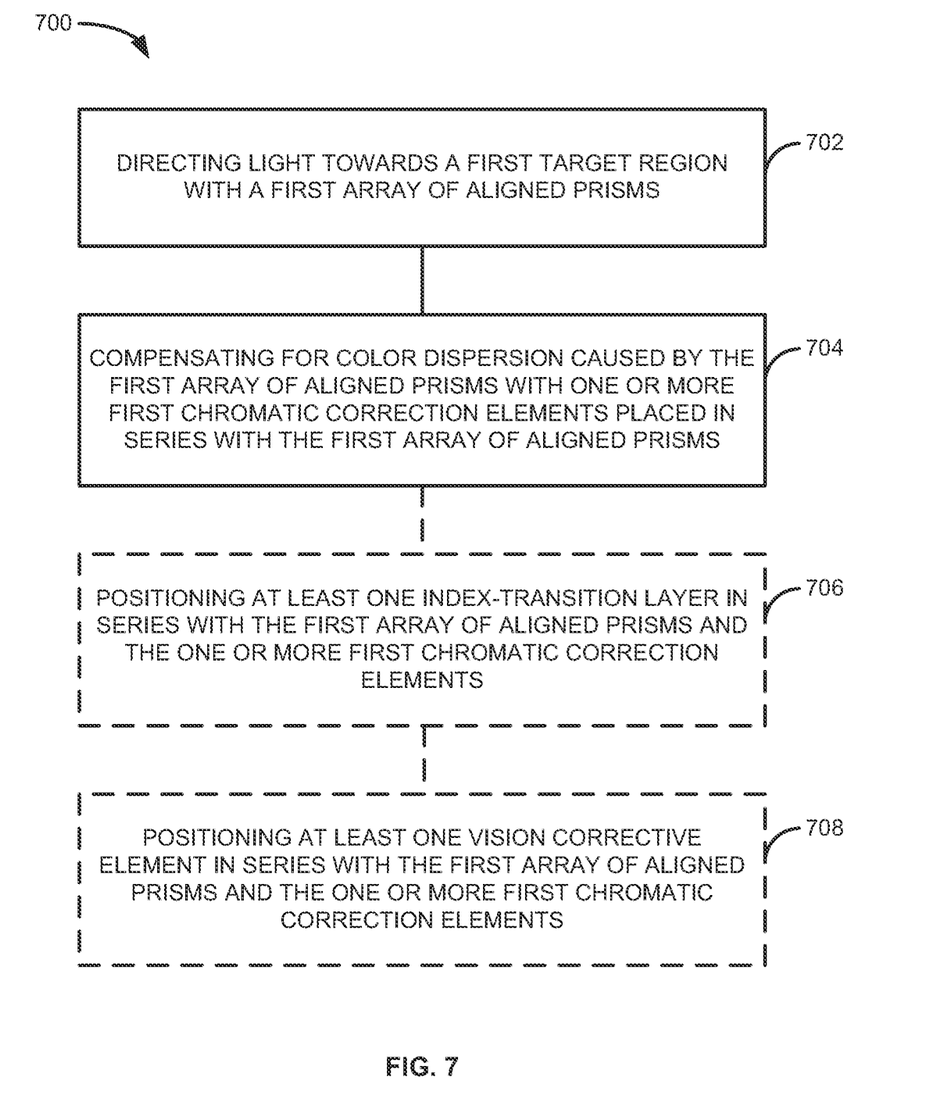
FIG. 7 is a flow chart illustrating a method of steering light towards a target region and applying a chromatic correction.

FIG. 7 is a flow diagram showing a process 700 for steering light towards a target region and applying a chromatic correction to account for color dispersion, chromatic aberrations, or the like. At block 702, the process 700 includes directing light towards a first target region with a first array of aligned prisms, such as the array of aligned prisms 202 described herein. At block 704, the process 700 includes compensating for color dispersion caused by the first array of aligned prisms with one or more first chromatic correction elements placed in series with the first array of aligned prisms. For example, one or more chromatic correction elements 204 can be placed in series with the array of aligned prisms 202, as described herein.

In some instances, the process 700 can further include (block 706) positioning at least one index-transition layer in series with the first array of aligned prisms and the one or more first chromatic correction elements. For example, an index-transition layer, such as index-transition layer 208, can be placed between materials forming the first array of aligned prisms and the one or more first chromatic correction elements to smooth transition of light through the materials. In some instances, the process 700 can include (block 708) positioning at least one vision corrective element in series with the first array of aligned prisms and the one or more first chromatic correction elements. For example, the first array of aligned prisms and the one or more first chromatic correction elements can be placed in series with or implemented within an eyeglass lens, contact lens, LASIK treated corneal tissue, intraocular lens, or the like. In some instances, the first array of aligned prisms and the one or more first chromatic correction elements can be adhered to a lens (e.g., eyeglass lens 304) with an adhesive layer (e.g., adhesive layer 212). The first array of aligned prisms and the one or more first chromatic correction elements can also be supported by a wearable or handheld frame (e.g., frame 302).

The process 700 can also be extended to directing light towards a second target region different from the first target region with a second array of aligned prisms, and compensating for color dispersion caused by the second array of aligned prisms with one or more second chromatic correction elements placed in series with the second array of aligned prisms. For example, the second target region can be another portion of retinal tissue in the same eye, or the second target region can be associated with a second eye (e.g., using multiple optical assemblies 200 with respective sets of prisms 202 and chromatic correction elements 204, as shown in FIG. 3A).

Figure 8:
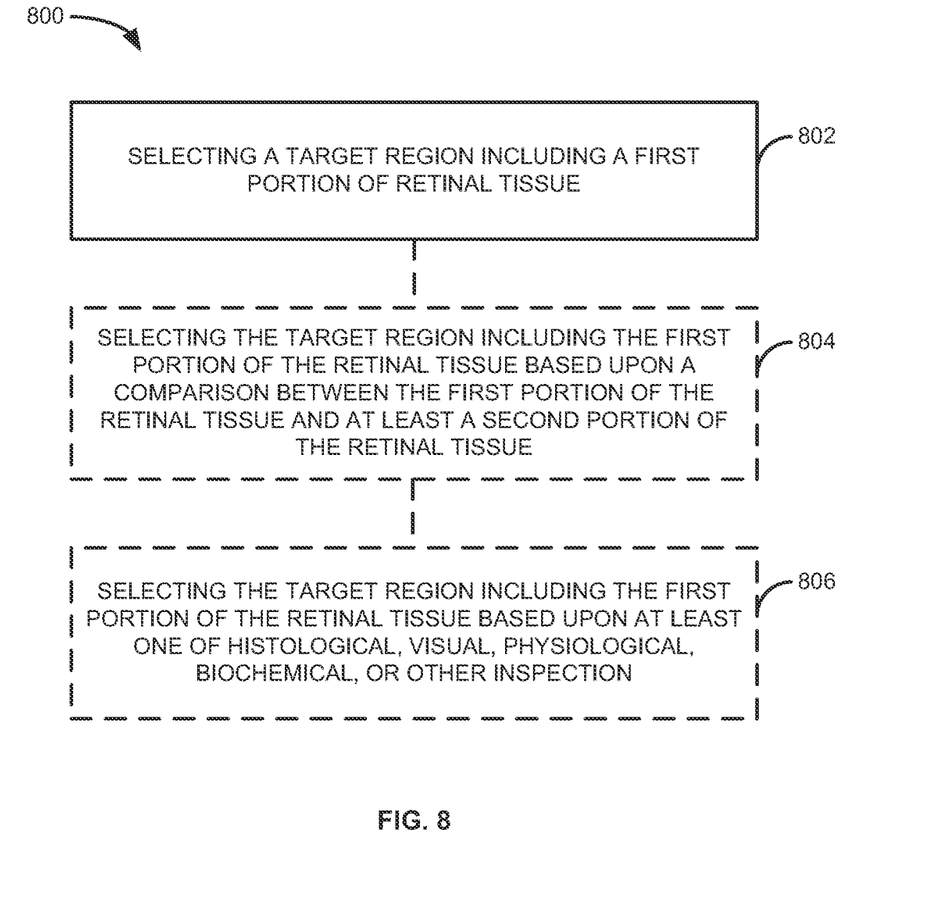
FIG. 8 is a flow chart illustrating a method of selecting a target region.

FIG. 8 is a flow diagram showing a process 800 for selecting a target region to steer light towards. At block 802, the process 800 includes selecting a target region including a first portion of retinal tissue. In some instances, the process 800 includes (block 804) selecting the target region including the first portion of retinal tissue based upon a comparison between the first portion of retinal tissue and at least a second portion of retinal tissue. For example, the selected portion of retinal tissue making up or included in the target region can be selected based upon a comparison between the selected portion of retinal tissue and at least one other portion of retinal tissue. In some instances, two or more fields of vision are tested at the same time or individually to compare performance of different portions of retinal tissue. For example, in an AMD patient, the macula, which is associated with an individual's central field of vision (FOV), may show poorer performance than an off-center FOV (e.g., FOV that is offset N or N' degrees to the right or left of the macula). In such cases, the target region can include a selected portion of retinal tissue that is within a range associated with a higher performing FOV. The strength and orientation of the array of aligned prisms 202 and the one or more chromatic correction elements 204 can be appropriate to a particular individual.

In some instances, the process 800 includes (block 806) selecting the target region including the first portion of retinal tissue based upon at least one of histological, visual, physiological, biochemical, or other inspection. For example, the selected portion of retinal tissue for the target region can also be selected based upon an examination, inspection, or diagnosis of AMD, diplopia, or any other disease or dysfunction affecting one or more portions of the retina or other structures in the eye. In some instances, a histological inspection can include an inspection of the eye using an ophthalmoscopy tool to view inner portions of the eye and possibly identify drusen or other debris affecting retinal tissue, scarring of retinal tissue, or any other abnormality. In some instances, a visual acuity test can be performed to test various FOVs. For example, an individual may be asked to read letters or numbers on a distantly placed chart. Patients with AMD may experience difficulty in reading letters or numbers located towards the center of the chart, while still being able to comfortably read similarly sized letters or numbers located at one or more outer edges of the chart. Other possible diagnostic examinations or inspections can include, but are not limited to, an Amsler grid test, eye angiogram, optical coherence test (OCT), contrast sensitivity test, refraction test, visual field test, or color vision test. Any combination of tests or inspections can be used to diagnose a dysfunction affecting one or both of an individual's eyes and determine an appropriate configuration for the optical assembly 200 to at least partially compensate for the diagnosed dysfunction. For example, the prisms 202 and chromatic correction elements 204 can be selected and aligned to direct light towards a target region including a higher performing patch of retinal tissue for a patient diagnosed with AMD or the like. In other examples, the prisms 202 and chromatic correction elements 204 can be selected and aligned to direct light towards an appropriate target region based on a measured or detected distortion or misalignment caused by dysfunctional corneal, lens, or eye muscle tissue for a patient diagnosed with double vision or other symptoms relating to light misalignment or blurring caused by dysfunctional eye structures.

Operations described with regards to processes 700 and 800 can be combined and/or performed in any order. For example, an operation described with regard to process 800 can be performed, followed by an operation described with regard to process 700, or vice versa; or a series of operations for process 700/800 can be performed, followed by a series of operation of the other process 800/700. Additional operations can also be performed, beyond those specifically described for processes 700 and 800. For example, any operation implied by a structural element or exemplary use of the optical assembly 200 as described with any of the foregoing embodiments.

The foregoing-described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Furthermore, it will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should NOT be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" and/or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense of one having skill in the art would understand the convention (e.g., "a system having at least one of A, B, and C" would include but not be limited to systems that have A alone, B alone, C alone, A and B together, A and C together, B and C together, and/or A, B, and C together). In those instances where a convention analogous to "at least one of A, B, or C, etc." is used, in general such a construction is intended in the sense of one having skill in the art would understand the convention (e.g., "a system having at least one of A, B, or C" would include but not be limited to systems that have A alone, B alone, C alone, A and B together, A and C together, B and C together, and/or A, B, and C together).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A wearable optical assembly, comprising:
   a first array of aligned prisms configured to direct light towards a first target region;
   a compensatory array of aligned prisms in series with the first array of aligned prisms, the compensatory array of aligned prisms having different dispersion characteristics than the first array of aligned prisms and being configured to compensate for color dispersion caused by the first array of aligned prisms;
   an index transition layer disposed between the first array of aligned prisms and the compensatory array of aligned prisms, the index transition layer including a material having an index of refraction based on a geometric mean of a first index of refraction of the first array of aligned prisms and a second index of refraction of the compensatory array of aligned prisms, wherein the first array of aligned prisms is positioned on a first side of the index transition layer and the compensatory array of aligned prisms is positioned inversely to the first array of aligned prisms on a second side of the index transition layer, the second side being opposite the first side; and
   an adhesive layer configured to couple the first array of aligned prisms and the compensatory array of aligned prisms with a lens, the adhesive layer being coupled to a cover material disposed upon the first array of aligned prisms, the cover material having a smooth surface that is in contact with the adhesive layer.

2. The wearable optical assembly of claim 1, wherein the compensatory array of aligned prisms includes material with different dispersion properties than the material of the first array of aligned prisms.

3. The wearable optical assembly of claim 1, wherein the first array of aligned prisms is formed by an interface between at least two materials, the at least two materials having smooth outer surfaces.

4. The wearable optical assembly of claim 3, wherein the at least two materials include a first material and a second material, wherein dispersion of the first material at least partially offsets dispersion of the second material.

5. The wearable optical assembly of claim 1, further including:
   a second array of aligned prisms configured to direct light towards a second target region different from the first target region; and
   one or more second chromatic correction elements in series with the second array of aligned prisms, the one or more second chromatic correction elements being configured to compensate for color dispersion caused by the second array of aligned prisms.

6. A system for improving vision, comprising:
   at least one vision corrective element;

a first array of aligned prisms coupled to a portion of the at least one vision corrective element, the first array of aligned prisms being configured to direct light towards a first target region;

a compensatory array of aligned prisms in series with the first array of aligned prisms, the compensatory array of aligned prisms having different dispersion characteristics than the first array of aligned prisms being configured to compensate for color dispersion caused by the first array of aligned prisms;

an index transition layer disposed between the first array of aligned prisms and the compensatory array of aligned prisms, the index transition layer including a material having an index of refraction based on a geometric mean of a first index of refraction of the first array of aligned prisms and a second index of refraction of the compensatory array of aligned prisms, wherein the first array of aligned prisms is positioned on a first side of the index transition layer and the compensatory array of aligned prisms is positioned inversely to the first array of aligned prisms on a second side of the index transition layer, the second side being opposite the first side; and an adhesive layer configured to couple the first array of aligned prisms and the compensatory array of aligned prisms with the at least one vision corrective element, the adhesive layer being coupled to a cover material disposed upon the first array of aligned prisms, the cover material having a smooth surface that is in contact with the adhesive layer.

7. The system of claim 6, wherein the compensatory array of aligned prisms includes material with different dispersion properties than the material of the first array of aligned prisms.

8. The system of claim 6, wherein the first array of aligned prisms is formed by an interface between at least two materials, the at least two materials having smooth outer surfaces.

9. The system of claim 6, wherein the compensatory array of aligned prisms is formed on a respective interior surface between at least two materials, the at least two materials having smooth outer surfaces.

10. The system of claim 6, further including:
a second array of aligned prisms configured to direct light towards a second target region different from the first target region; and
one or more second chromatic correction elements in series with the second array of aligned prisms, the one or more second chromatic correction elements being configured to compensate for color dispersion caused by the second array of aligned prisms.

11. The system of claim 6, further including:
a wearable frame supporting the at least one vision corrective element, the first array of aligned prisms, and the compensatory array of aligned prisms.

* * * * *